(12) United States Patent
Yamaguchi

(10) Patent No.: US 6,592,188 B2
(45) Date of Patent: Jul. 15, 2003

(54) WHEEL BALANCE WEIGHT

(75) Inventor: Yutaka Yamaguchi, Higashikamo-gun (JP)

(73) Assignee: Toho Kogyo Co., Ltd., Higashikamo-gun (JP)

( * ) Notice: Subject to any disclaimer, the term of this patent is extended or adjusted under 35 U.S.C. 154(b) by 0 days.

(21) Appl. No.: 09/983,482

(22) Filed: Oct. 24, 2001

(65) Prior Publication Data

US 2002/0140281 A1 Oct. 3, 2002

(30) Foreign Application Priority Data

Apr. 3, 2001 (JP) ........................................ 2001-104338

(51) Int. Cl.⁷ ................................................ B60B 1/00
(52) U.S. Cl. ....................................................... 301/5.21
(58) Field of Search ........................ 301/5.21; 428/40.1, 428/41.8

(56) References Cited

U.S. PATENT DOCUMENTS

| | | | |
|---|---|---|---|
| 1,692,145 A | * | 11/1928 | Woolson ..................... 301/5.21 |
| 2,973,225 A | | 2/1961 | Antraigue |
| 3,960,409 A | | 6/1976 | Songer |
| 4,379,596 A | * | 4/1983 | Greene et al. ............. 301/5.21 |
| 6,286,906 B1 | * | 9/2001 | Nagashima et al. ....... 301/5.21 |

FOREIGN PATENT DOCUMENTS

| | | |
|---|---|---|
| DE | 91 16 322 | 7/1992 |
| EP | 1 039 169 | 9/2000 |
| EP | 1 067 310 | 1/2001 |
| WO | 99/00609 | 1/1999 |
| WO | 99/55924 | 11/1999 |

* cited by examiner

Primary Examiner—Russell D. Stormer
(74) Attorney, Agent, or Firm—Jacobson Holman PLLC

(57) ABSTRACT

A wheel balance weight includes a plurality of weights, an adhesive sealing member and a regulatory member. The adhesive sealing member fastens the plurality of weights onto an inner peripheral surface of a rim in a wheel, and has an adhesive surface to be bonded to the inner peripheral surface. The regulatory member inhibits at least two of the plurality of weights, being disposed to neighbor with each other, from moving by greater than a predetermined magnitude. Hence, the wheel balance weight deal can be dealt with readily before it is installed to the wheel, is likely to conform to the inner surface, and can have a desired mass by adjusting the number of the weights.

9 Claims, 5 Drawing Sheets

WHEEL BALANCE WEIGHT

BACKGROUND OF THE INVENTION

1. Field of the Invention

The present invention relates to a wheel balance weight, which is installed to a wheel of a tire in a vehicle so as to cancel the unbalance in the wheel. Specifically, it relates to a wheel balance weight, which is fastened by an adhesive tape onto an inner peripheral surface of a rim in the wheel.

2. Description of the Related Art

In a wheel-assembled state; namely: in a state where a tire of an automobile, or the like, is assembled with a wheel, there arises a drawback in that, as the unbalance enlarges in the peripheral direction around the rotary shaft of the wheel assembly as well as in the direction of the rotary shaft of the wheel assembly, the vibrations, noises, and the like, generate when driving a vehicle.

The vibrations and noises result from the unbalance in the wheel. Accordingly, the wheel is equipped with a wheel balance weight, which can cancel the unbalance. The installation position of the wheel balance weight to the wheel and the mass of the wheel balance weight are determined by measuring the unbalance of the wheel assembly with a special purpose measuring apparatus.

As one of the conventional wheel balance weights, there has been, for example, a wheel balance weight, which is installed to an inner peripheral surface of a rim in the wheel by bonding a substantially plate-shaped weight, having a predetermined mass, by means of an adhesive tape, etc.

When the conventional wheel balance weight is manufactured, the weight is formed as a flat plate shape. When it is installed to the rim in the wheel, the weight is curved along the inner peripheral surface of the rim in the wheel. Specifically, the conventional wheel balance has been dealt with in the aforementioned manner, because the curvature of the inner peripheral surface of the rim, to which the wheel balance weight is installed, depends on wheels to be equipped with tires.

In the conventional wheel balance weight, the weight has been formed of lead, which is one of soft materials. The weight, which is formed of lead, can be readily processed, and can be readily molded with a manual labor. However, it has been known that lead put a large load onto environment when it is abolished. Consequently, ferrous alloys, which put a less load onto environment, have come to be employed as a material for the weight.

In a wheel balance weight, which is installed to the inner peripheral surface of the rim in the wheel by bonding a weight, which is formed of a ferrous alloy in the form of a substantially strip shape, with an adhesive tape, etc., there arises a problem in that a large force is required when the wheel balance weight is installed to the wheel.

Specifically, when installing the conventional wheel balance weight, it is also necessary to mold the weight, which is composed of a ferrous alloy, into a curved shape conforming to the inner peripheral surface of the rim in the wheel. However, because ferrous alloys exhibit a high hardness, an extra labor is required to carry out the molding.

SUMMARY OF THE INVENTION

The present invention has been developed in view of the aforementioned circumstances. It is therefore an object of the present invention to provide a wheel balance weight, which can be readily installed to a wheel.

In order to carry out the object, the inventors of the present invention thought of making a wheel balance weight with a plurality of weights and a regulatory member for inhibiting the plurality of weights from moving. Thus, the inventors discovered that it was possible to solve the problems, which were associated with the conventional wheel balance weight.

For example, a wheel balance weight according to the present invention is characterized in that it comprises: a plurality of weights; an adhesive sealing member, having an adhesive surface to be bonded to an inner peripheral surface of a rim in a wheel, for fastening the plurality of weights onto the inner peripheral surface; and a regulatory member for inhibiting at least two of the plurality of weights, being disposed to neighbor with each other, from moving by a predetermined magnitude or more.

Since the present wheel balance weight has the plurality of weights, it is likely to conform to an inner peripheral surface of a rim in a wheel when it is installed to the inner peripheral surface of the rim in the wheel. Moreover, in the present wheel balance weight, since the regulatory member inhibits at least two of the weights from moving by a predetermined magnitude or more, it does not bend between the two weights before the present wheel balance weight is installed to a wheel. Thus, it is possible to deal with the present wheel balance weight with ease.

In addition, it is possible to adjust the number of the weights by cutting the regulatory member and adhesive sealing member between the plurality of weights. Thus, it is possible to give a desired mass to the present wheel balance weight.

The present wheel balance weight deal can be dealt with readily, because the regulator member inhibits at least two of the weights from moving by a predetermined magnitude or more so that it does not bend between the two weights before it is installed to a wheel.

Further, the present wheel balance weight is likely to conform to an inner surface of a rim in a wheel when it is installed to the inner peripheral surface, because it has the plurality of weights.

Furthermore, the number of the weights can be adjusted by cutting the regulatory member and the adhesive sealing member between the plurality of weights. The present wheel balance weight can make a wheel balance weight, which has a desired mass.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
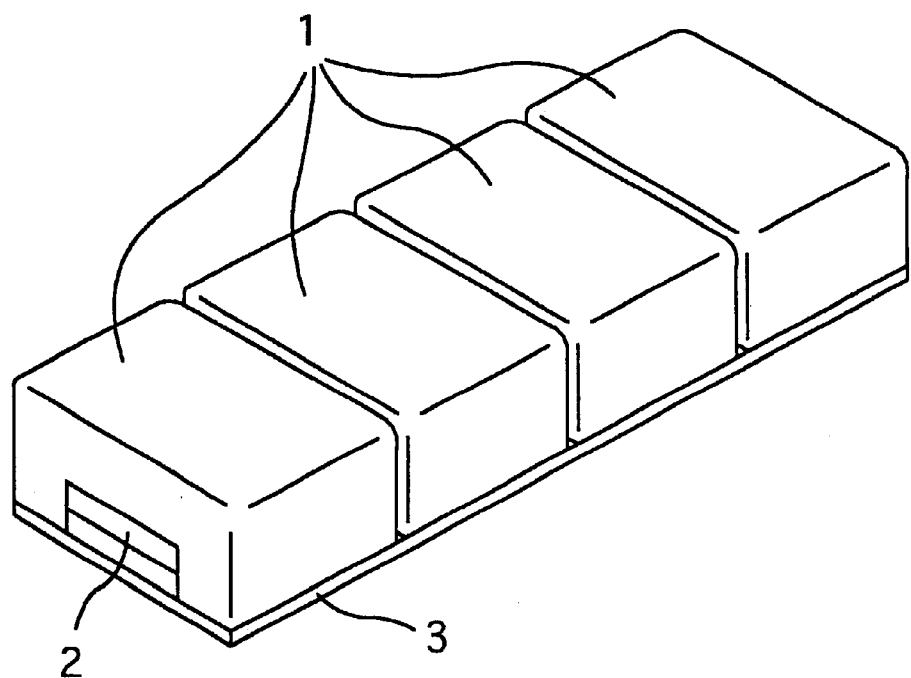
FIG. 1 is a perspective view for illustrating Example No. 1 of a wheel balance weight according to the present invention.

Having generally described the present invention, a further understanding can be obtained by reference to the specific preferred embodiments which are provided herein for the purpose of illustration only and not intended to limit the scope of the appended claims.

A wheel balance weight according to the present invention comprises a plurality of weights, an adhesive sealing member and a regulatory member.

In the present wheel balance weight, the weights cancel the unbalance in a wheel assembly when the present wheel balance weight is installed to a wheel. Since the present wheel balance weight comprises the plurality of weight, it is likely to readily conform to a curved surface of the wheel when the present wheel balance weight is installed to the wheel. For example, the present wheel weight balance effects the advantage in the following manner. Since the plurality of weights satisfy the mass, which is required for the present wheel balance weight, the weights can be downsized. As a result, the rear surface of the respective weights can substantially conform to the curved surface of the wheel.

Note that, unless otherwise specified, the surface of the weights, which is disposed to face the central axis side of the wheel when the present wheel balance weight is installed to the wheel, is herein referred to as a "front surface", and the surface of the weights, which are disposed to face the inner peripheral surface side of the rim in the wheel when the present wheel balance is installed to the wheel, is herein referred to as a "rear surface" in the specification of the present invention.

Since the present wheel balance weight comprises the plurality of weights, it is possible to readily adjust the entire mass of the present wheel balance weight. In other words, since the plurality of weights have a predetermined mass, respectively, it is possible to adjust the mass of the present wheel balance weight by adjusting the number of the weights.

The adhesive sealing member is a component member, which has an adhesive surface to be fastened to the inner peripheral surface of the wheel, and which fastens the plurality of weights to the inner peripheral surface. Specifically, the plurality of weights are fastened to the wheel by bonding the adhesive surface to the inner peripheral surface of the wheel. Note that the adhesive sealing member can simply fasten the plurality of weights to the inner surface of the rim in the wheel, and that it cannot necessarily be brought into contact with the weights.

The adhesive sealing member can preferably be an adhesive tape, which has an adhesive surface to be bonded onto the inner peripheral surface of the rim in the wheel. Since the adhesive tape is less expensive, it does not increase the material cost of the present wheel balance weight. The adhesive tape can preferably be a double-side-coated adhesive tape. When the adhesive tape is a double-side-coated adhesive tape, one of the adhesive sides of the double-side-coated adhesive tape is adhered onto the inner peripheral surface of the rim in the wheel, and the other one of the adhesive sides thereof is bonded onto the plurality of weights.

The regulatory member is a component member, which inhibits at least two of the weights, which are disposed to neighbor with each other, from moving by a predetermined magnitude or more. When the regulatory member inhibits at least two of the neighboring weights from moving by a predetermined magnitude or more, it becomes easy to deal with the present wheel balance weight. Note that the "moving by a predetermined magnitude or more" herein means the moving other than curving the present wheel balance weight along the inner peripheral surface of the rim in the wheel. For example, the "moving by a predetermined magnitude or more" shall mean the bending between the two weights connected in succession, the twisting of the two weights connected in succession, and so on.

The weights can preferably have means for supporting the regulatory member. Specifically, when the weights have the supporting means, the relative positions of the plurality of weights can be determined, respectively. As a result, in the manufacture of the present wheel balance weight, the plurality of weights can be assembled with ease.

The supporting means can preferably be means, which supports the regulatory member inside the weights. Note that "the inside of the weights where the regulatory member is supported" herein means the furthermore inner portion with respect to the outer peripheral surface of the weights.

The supporting means can be a grooved portion, which is formed in the weights and in which the regulatory member is disposed. When the supporting means is such a grooved portion, it is possible to make the weights having the supporting means at a less expensive cost. When the supporting means is the grooved portion, it is possible to readily dispose the regulatory member in the supporting means.

The grooved portion can preferably be formed in the rear surface of the weights. Thus, the regulatory member is disposed on the rear-surface side of the weights, and accordingly the curvature radius of the regulatory member enlarges, compared with the case where the grooved portion is formed in the front-surface side of the weights. In other words, since the magnitude of deformation decreases in the regulatory member, the residual stress is less likely to generate in the regulatory member after the regulatory member is deformed. As a result, the present wheel balance weight as a whole is likely to conform to the inner surface of the rim in the wheel when it is installed to the wheel.

The regulatory member can preferably be formed as a plate shape which has a width being equal to a width of the grooved portion. In a case where the regulatory member has a width coinciding with the width of the grooved portion, the regulatory member is supported by side surfaces of the grooved portion. Thus, it is possible to inhibit the weights from moving in the width-wise direction.

The regulatory member can preferably be formed as a linear shape in which at least one of the outer peripheral surfaces agrees with the inner peripheral surface of the grooved portion. In a case where the regulatory member is formed as a linear shape in which at least one of the outer peripheral surfaces agrees with the inner peripheral surface of the grooved portion, the outer peripheral surface of the regulatory member is supported by the inner peripheral surface of the grooved portion when the regulatory member is disposed in the grooved portion. Hence, it is possible to inhibit the weights from moving in the width-wise direction.

When the regulatory member is formed as a linear shape, it is preferable to form a plurality of the grooved portions. Specifically, when a plurality of the grooved portions are formed, the regulatory member inhibits the weights from moving at a plurality of positions. Thus, it is possible to inhibit the weights from twisting, for example.

The grooved portion can preferably be narrowed at the opening. Specifically, when the grooved portion is narrowed at the opening, it is possible to inhibit the regulatory member, which is disposed in the grooved portion, from protruding out of the opening of the grooved portion. To put it differently, since the grooved portion is narrowed at the opening, the regulatory member does not project from the weights when the present wheel balance weight is installed to the wheel. Hence, it is possible to safely bend the present wheel balance weight.

Note that the means for narrowing the opening of the grooved portion is not limited in particular. It is possible, however, to exemplify the following means. Flanged portions, which project from the weights, can be formed to the opening of the grooved portion in the weights, and the flanged portions can be deformed while disposing the regulatory member in the grooved portion.

The supporting means can preferably be a through hole into which the regulatory member, being formed so as to penetrate through the weights, is fitted. When the supporting means is the through hole, it is possible to keep the volumetric increment of the weights minimum, volumetric increment which results from being provided with the supporting means.

The regulatory member can preferably have a cross-sectional shape, which substantially agrees with a cross-sectional shape of the through hole. When the cross-sectional shapes of the through hole and regulatory member agree with each other substantially, the space between the regulatory member and the through hole disappears so that the weights do not deviate with each other. Moreover, when the cross-sectional shape of the through hole is formed as a circular shape, it is preferable to use a wire rod as the regulatory member.

The through hole can preferably be formed in a plurality of quantities substantially parallelly with each other. When a plurality of the through holes are formed, it is possible to inhibit the neighboring weights from twisting with each other.

The regulatory member can preferably be fastened to the weights. When the regulatory member is fastened to the weights, the positions of the weights themselves are determined by the regulatory member, and thereby the relative positions of the plurality of weights are determined, respectively. As a result, in the manufacture of the present wheel balance weight, the plurality of weights can be assembled with ease.

The way how to fasten the regulatory member to the weights is not limited in particular, and can be any means as far as they are fastened. For example, it is possible to exemplify the following fastening means. A boss can be formed on the weights; through holes, into which the bosses penetrate, can be formed in the regulatory member; and then the bosses can be crimped while they penetrate through the through holes. Alternatively, the regulatory member and the bosses can be bonded integrally by welding, or the like.

The plurality of weights can preferably be disposed at predetermined intervals linearly. When the plurality of weights are disposed at predetermined intervals linearly, the weights conform to the curved shape of the inner peripheral surface of the rim. Specifically, when the present wheel balance weight is installed to a wheel, the respective weights are disposed in the shape of a substantially curved shape. At this moment, in the neighboring two weights, the distance between the opposite front-surface-side ends is shorter than the distance between the opposite rear-surface-side ends. Accordingly, when the weights are disposed at predetermined intervals, such a distance difference can be diminished. When the present wheel balance weight is installed to a wheel, the plurality of weights, which are disposed linearly, can preferably be disposed in a peripheral direction of the wheel.

The weights can preferably be composed of a ferrous metal. Specifically, in a case where the weights are composed of a ferrous metal, the present wheel balance weight exerts a less load to environment when it is scraped. As for a ferrous alloy for forming the weights, it is possible to use alloys whose major component is iron. For instance, it is possible to exemplify pure iron, steel, stainless steel, etc.

The regulatory member can preferably be composed of a metal. When the regulatory member is made of a metal, it exhibits a sufficient strength for regulating the weights. Thus, it is possible to inhibit the weights from moving by a predetermined magnitude or more.

In the present wheel balance weight, one regulatory member can preferably inhibit three or more weights from moving by a predetermined magnitude or more. Thus, it is possible to inhibit the plurality of weights from moving by a predetermined magnitude or more with one regulatory member. As a result, the number of component parts required for making the present wheel balance weight is reduced, and accordingly the cost for the component parts as well as the cost for the manufacture can be diminished.

The regulatory member can preferably be made of a plate or a wire rod. When the regulatory member is made of a plate or a wire rod, it is possible to make the present wheel balance weight conform to an inner peripheral surface of a wheel. Specifically, when the regulatory member is made of a plate or a wire rod, it is possible to allow the weights a predetermined magnitude of movement, which is required for installing the present wheel balance weight to a wheel.

Moreover, when the regulatory member is made of a plate or a wire rod, it is possible to dispose the plurality of weights in the extending direction of the regulatory member. Thus, it is possible to inhibit the plurality of weights from moving by a predetermined magnitude or more with one regulatory member. As a result, the number of component parts required for making the present wheel balance weight is reduced, and accordingly the cost for the component parts as well as the cost for the manufacture can be diminished.

The present wheel balance weight can preferably be subjected to a rust-prevention treatment. Specifically, since the wheels of a vehicle are likely to contact with moisture, such as rain, etc., the unbalance in the wheels may be canceled incompletely when rust arises in the present wheel balance weight.

In the present wheel balance weight, since the regulatory member inhibits the weights from moving by a predetermined magnitude or more, the present wheel balance weight does not bend between two weights before it is installed to a wheel. Consequently, it is easy to deal with the present wheel balance weight.

Moreover, the present wheel balance weight comprises the plurality of weights. Accordingly, when it is installed to an inner peripheral surface of a rim in a wheel, it is likely to conform to a shape of the inner peripheral surface.

In addition, in the present wheel balance weight, it is possible to adjust the number of weights by cutting the regulatory member and the adhesive sealing member between the plurality of weights. Hence, it is possible to give a desired mass to the present wheel balance weight.

The present invention will be hereinafter described in detail with reference to specific examples.

The following wheel balance weights were made as specific examples according to the present invention.

EXAMPLE NO. 1

Figure 2:
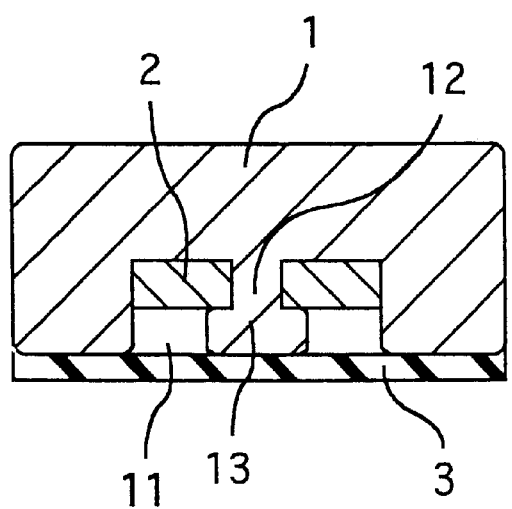
FIG. 2 is a cross-sectional view for illustrating a weight in Example No. 1 of the present wheel balance weight.

FIGS. 1 and 2 illustrate a wheel balance weight of Example No. 1 according to the present invention. The wheel balance weight of Example No. 1 is constituted by four weights 1, a regulatory plate 2 and a double-side-coated tape 3. The four weights 4 are disposed at predetermined intervals. The regulatory plate 2 is held in the four weights 1 while it penetrates through the four weights 1. The double-side-coated tape 3 was disposed on a rear surface of the weights 4, and was formed integrally with the weights 1. Note that the four weights 1 were disposed in such a state that they are separated with each other by a small interval.

The respective weights 1 include a grooved portion 11 and a boss 12, and is a component member, which is formed as a substantially rectangular parallelepiped having a predetermined mass. The grooved portion 11 is formed as a dented shape in the rear surface of the weights 1, rear surface which contacts with the double-side-coated tape 3 when the wheel balance weight of Example No. 1 is installed to an inner peripheral surface of a rim in a wheel. The boss 12 projects from a bottom surface of the grooved portion 11, and has a crimped leading end portion 13. The leading end portion 13 is positioned flush with the rear surface of the weights 1 in which the grooved portion 11 is formed.

The respective weights 1 are made of a ferrous rectangular parallelpiped shaped material whose outer shape is 18 mm in width, 11.5 mm in length and 3 mm in thickness. The grooved portion 11 has a width of 8.2 mm, extending in opposite directions with respect to the center line of the rear surface, and a depth of 1 mm from the outermost rear surface. The grooved portion 11 is formed so as to cross the respective weights 1 in the length-wise direction.

Figure 3:
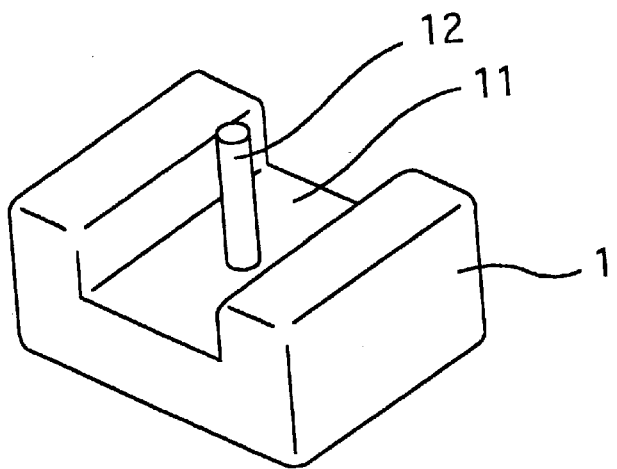
FIG. 3 is a perspective view of one of the weights, which are employed by Example No. 1 of the present wheel balance weight.

The boss 12 has a diameter of 4 mm, and is formed so as to protrude from the bottom surface of the grooved portion 11. Note that, as illustrated in FIG. 3, the boss 12 is formed so as to project beyond the rear surface of the weights 1 before the leading end portion 13 is formed by crimping.

Figure 4:
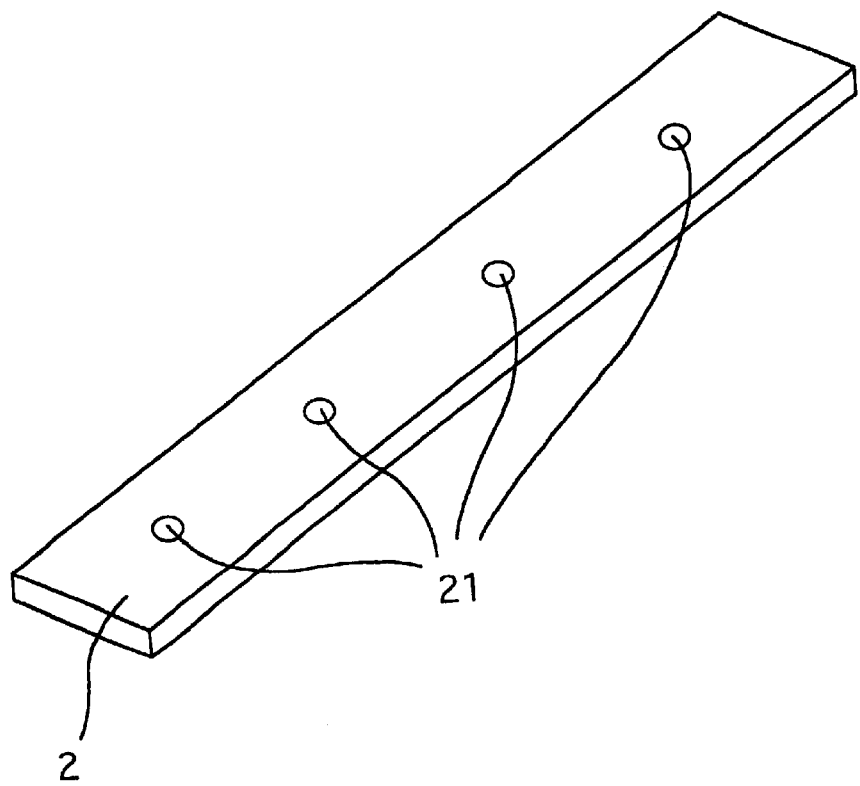
FIG. 4 is a perspective view of a regulatory plate, which is employed by Example No. 1 of the present wheel balance weight.

As illustrated in FIG. 4, the regulatory plate 2 is a plate-shaped component member, which is held in the grooved portion 11 formed in the weights 1. In the regulatory plate 2, there are formed through holes 21 into which the bosses 12 penetrate when the regulatory plate 1 is held in the grooved portion 11 of the weights 1.

For example, the regulatory plate 2 is made of an iron plate, which has a width of 8.2 mm, a length of from 11.5 to 170 mm and a thickness of 0.5 mm. Moreover, in the regulatory plate 2, there are formed through holes 21, which have a diameter of 4 mm.

The double-side-coated tape 3 is made of a double-side-coated adhesive tape whose opposite surfaces have an adhesive surface. Hence, the double-side-coated tape 3 makes the wheel weight balance of Example No. 1 bond onto an inner peripheral surface of a rim in a wheel with one of the adhesive surfaces, and is bonded to the weights 1 with the other one of the adhesive surfaces.

Since the regulatory plate 2 is fastened to the weights 1 in the wheel balance weight of Example No. 1, the plurality of weights 1 are inhibited from moving by a predetermined magnitude or more. As a result, it is easy to deal with the wheel balance weight of Example No. 1 before it is installed to a wheel.

(Manufacturing Process)

The wheel balance weight of Example No. 1 could be manufactured in the following manner. First, the weights 1 and the regulatory plate 2 were formed. Then, the regulatory plate 2 was fitted into the grooved portions 11 of the weights 1. Finally, the double-side-coated tape 3 was bonded onto the rear surfaces of the weights 1.

For instance, the weights 1 were first formed by such means as pressing an iron plate, forging a wire rod, and the like. Note that, in the resulting weights 1, the bosses 12 were formed so as to project beyond the rear surfaces of the respective weights 1. In FIG. 3, there is illustrated how the leading end of the boss 12 projected beyond the rear surface of the weights 1.

The regulatory plate 2 was manufactured by pressing an iron plate. In FIG. 4, there is illustrated the resultant regulatory plate 2.

Subsequently, the regulatory plate 2 was fitted into the grooved portions 11 of the weights 1. In the operation, the bosses 12 penetrated through the through holes 21 of the regulatory plates 2. Note that the regulatory plate 2 was fitted into the grooved portions 11 so as to bring one of the opposite surfaces into contact with the bottom surfaces of the grooved portions 11.

Figure 5:
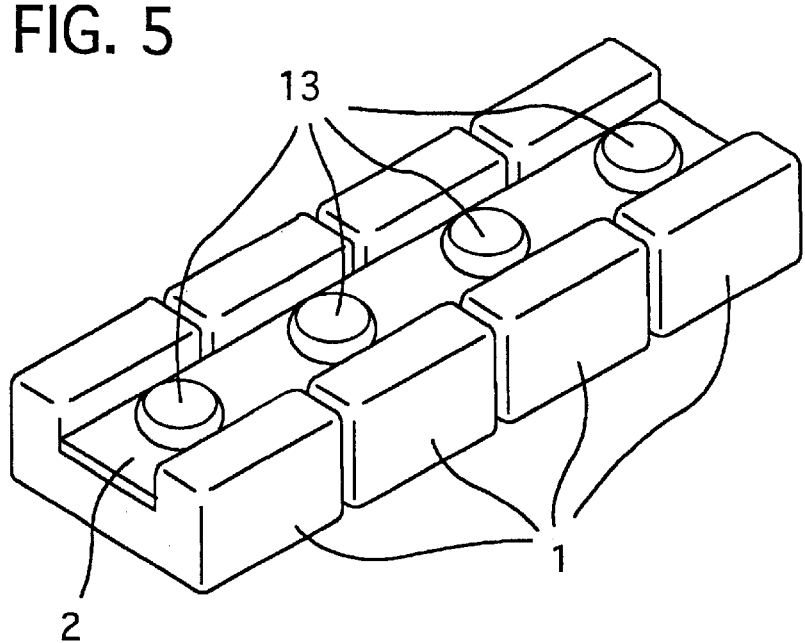
FIG. 5 is a perspective view for illustrating how the weights and the regulatory plate are bonded in Example No. 1 of the present wheel balance weight.

Thereafter, the leading ends of the bosses 12, which penetrated through the through holes 21 and which projected beyond the rear surfaces of the weights 1, were crimped so that the surfaces of the leading end portions 13 were flush with the rear surfaces of the weights 1. Since the leading end portions 13 were formed larger than the through holes 21 in terms of the diameter, the regulatory plate 2 was fastened to the weights 1. In FIG. 5, there is illustrated how the regulatory plate 1 was fastened to the weights After the wheel balance weight of Example No. 1, in which the regulatory plate 2 was fastened to the weights 1, was subjected to a plating treatment, one of the adhesive surfaces of the double-side-coated tape 3 was bonded onto the rear surfaces of the weights 1 as well as the leading end portions 13 of the bosses 12. The wheel balance weight of Example No. 1 was thus manufactured.

(Installation of Wheel Balance Weight)

Figure 6:
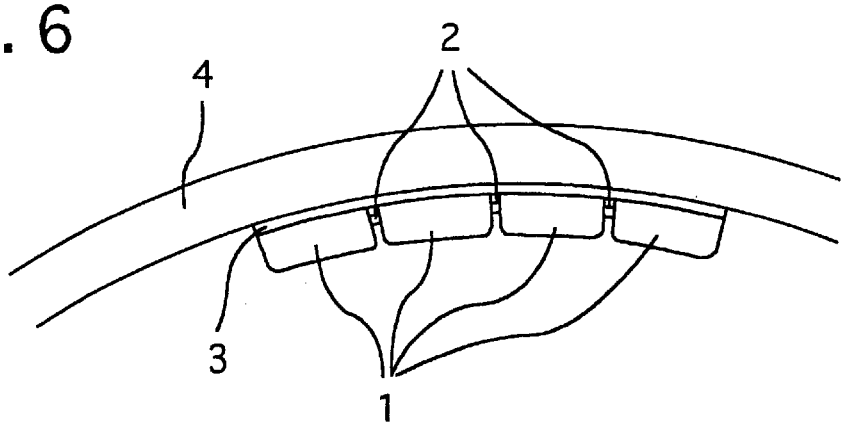
FIG. 6 is a schematic diagram for illustrating a state in which Example No. 1 of the present wheel balance weight is installed to a wheel.

The wheel balance weight of Example No. 7 was actually installed to a wheel by the following procedure. In FIG. 6, there is illustrated how the wheel balance weight was installed onto an inner peripheral surface of a rim in a wheel 4.

First, the mass of the wheel balance weight of Example No. 1 was adjusted to a mass, which is desirable for canceling the unbalance in the wheel 4, by cutting the regulatory plate 2 and the double-side-coated tape 3 between the neighboring weights 1, 1.

Subsequently, the wheel weight balance of Example No. 1 was installed to the wheel 4 in the following manner. The adhesive surface of the double-side-coated tape 3 of the wheel balance weight of Example No. 1 was exposed. The exposed adhesive surface was applied onto a predetermined position on an inner peripheral surface of a rim in the wheel 4. In the installation, the weights 1, 1, 1 and 1, which were connected in series, were installed to the wheel 4 so that they were arranged in a peripheral direction of the wheel 4.

Note that, in the wheel balance weight of Example No. 1, the weights 1, 1, 1 and 1 were pressed onto the inner peripheral surface of the rim in the wheel 4 and thereby the regulatory plate 2 was deformed to a curved shape, which substantially coincides with a shape of the inner peripheral surface of the wheel 4. In the mean time, since the four weights 1 were connected to the regulatory plate 2 with intervals provided therebetween, the distance between the opposite front-surface-side ends of the neighboring weights 1,1 was shorter than the distance between the opposite rear-surface-side ends thereof.

As a result, the wheel balance weight of Example No. 1 could be installed in such a state that it conformed to the curved inner peripheral surface of the rim in the wheel 4.

EXAMPLE NO. 2

Figure 7:
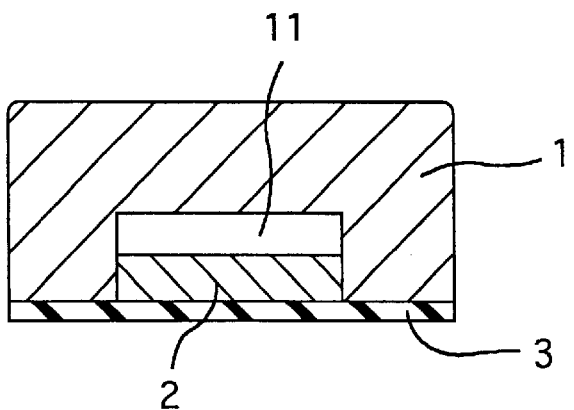
FIG. 7 is a cross-sectional view for illustrating a weight in Example No. 2 of a wheel balance weight according to the present invention.

A wheel balance weight of Example No. 2 according to the present invention comprises weights 1. FIG. 7 illustrates a cross section of the weights 1.

The wheel balance weight of Example No. 2 is constituted by a plurality of the weights 1, a strip-shaped regulatory plate 2 and a double-side-coated tape 3. The weights 1 have a grooved portion 11, which is formed in the rear surface. The strip-shaped regulatory plate 2 is disposed in the grooved portions 11. The double-side-coated tape 3 is adhered onto the weights 1 and the regulatory plate 2. Note that, in the wheel balance weight of Example No. 2, the regulatory plate 2 is simply disposed in the grooved portions 11 of the weights 1 and is simply brought into contact with the weights 1. Thus, the strip-shaped regulatory plate 2 and the weights 1 are not bonded with each other directly.

Except that the bosses 12 are not formed in the grooved portions 11, the weights 1 in the wheel balance weight of Example No. 2 are identical with the weights 1 in the wheel balance of Example No. 1.

Except that the through holes 21 are not formed, the regulatory plate 2 is a strip-shaped metallic plate, which is identical with the regulatory plate 2 in the wheel balance weight of Example No. 1.

As for the double-side-coated tape 3, a double-side-coated tape is employed which is the same as the double-side-coated tape 3 in the wheel balance weight of Example No. 1.

In the wheel balance weight of Example No. 2, since the regulatory plate 2 is fixed in the grooved portions 11 of the weights 1 by the double-side-coated tape 3, the plurality of the weights 1 are inhibited from moving by a predetermined magnitude or more. Therefore, it is easy to deal with the wheel balance weight of Example No. 2 before it is installed to a wheel.

Moreover, in the wheel balance weight of Example No. 2, since the weights 1 and the regulatory plate 2 are not bonded integrally, the wheel balance weight effects an advantage in that it can reduce the cost required for manufacturing itself.

EXAMPLE NO. 3

Figure 8:
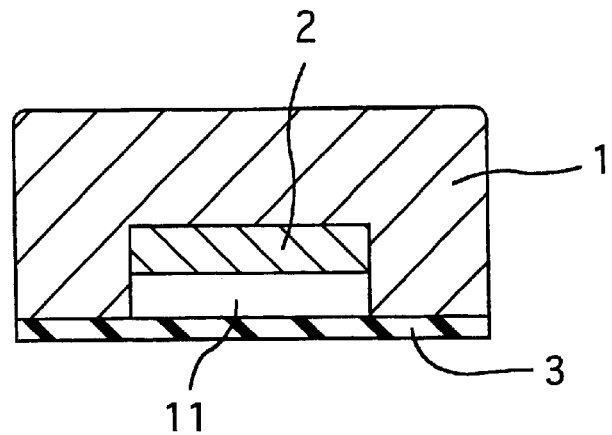
FIG. 8 is a cross-sectional view for illustrating a weight in Example No. 3 of a wheel balance weight according to the present invention.

A wheel balance weight of Example No. 3 according to the present invention comprises weights 1. FIG. 8 illustrates a cross section of the weights 1.

The wheel balance weight of Example No. 3 is constituted by a plurality of the weights 1, a strip-shaped regulatory plate 2 and a double-side-coated tape 3. The weights 1 have a grooved portion 11, which is formed in the rear surface. The strip-shaped regulatory plate 2 is bonded to the bottom surface of the grooved portions 11. The double-side-coated tape 3 is adhered onto the rear surfaces of the weights 1.

Specifically, in the wheel balance weight of Example No. 3, the regulatory plate 2 is bonded to the bottom surfaces of the weights 1. Moreover, the regulatory plate 2 is not bonded to the double-side-coated tape 3.

As for the weights 1, the regulatory plate 2 and the double-side-coated tape 3, the component members are identical with those used in Example No. 2.

Moreover, in the wheel balance weight of Example No. 3, the weights 1 and the regulatory plate 2 are bonded by spot welding. Note that the means for bonding the weights 1 and the regulatory member 2 is not limited in particular as far as the means can bond them together. For example, the weights 1 and the regulatory plate 2 can be bonded by an adhesive, a double-side-coated tape, or the like.

In the wheel balance weight of Example No. 3, since the regulatory plate 2 is fastened to the weights 1, the plurality of the weights 1 are inhibited from moving by a predetermined magnitude or more. Therefore, it is easy to deal with the wheel balance weight of Example No. 3 before it is installed to a wheel.

In addition, in the wheel balance weight of Example No. 3, since the weights 1 and the regulatory plate 2 are bonded by spot welding, they can be bonded at a less expensive cost. Hence, the wheel balance weight effects an advantage in that it can reduce the cost required for manufacturing itself.

EXAMPLE NO. 4

Figure 9:
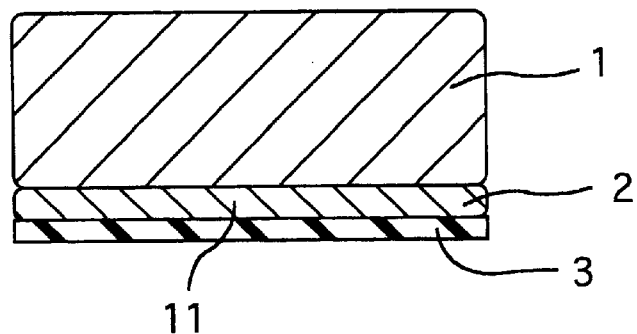
FIG. 9 is a cross-sectional view for illustrating a weight in Example No. 4 of a wheel balance weight according to the present invention.

A wheel balance weight of Example No. 4 according to the present invention comprises weights 1. FIG. 9 illustrates a cross section of the weights 1.

The wheel balance weight of Example No. 4 is constituted by a plurality of the weights 1, a strip-shaped regulatory plate 2 and a double-side-coated tape 3. The weights 1 are formed substantially as a rectangular parallelepiped. The strip-shaped regulatory plate 2 is bonded to the rear surfaces of the weights 1. The double-side-coated tape 3 is adhered onto the rear surface of the strip-shaped regulatory plate 2.

The weight 1 is composed of a substantially rectangular parallelepiped-like metallic material whose outer contour has a size of 20 mm in width, 11.5 mm in length and 3 mm in thickness.

The regulatory plate 2 is composed of an iron plate, which has a size of 20 mm in width, from 11.5 to 170 mm in length and 0.5 mm in thickness.

The double-side-coated tape 3 has a strip shape, which agrees with the rear surface of the regulatory plate 2. As for the double-side-coated plate 3, a double-side-coated tape is used which is the same as the one used in Example No. 1.

Moreover, in the wheel balance weight of Example No. 4, the weights 1 and the regulatory plate 2 are bonded by spot welding. Note that the means for bonding the weights 1 and the regulatory member 2 is not limited in particular as far as the means can bond them together. For example, the weights 1 and the regulatory plate 2 can be bonded by an adhesive, a double-side-coated tape, or the like.

In the wheel balance weight of Example No. 4, since the regulatory plate 2 is fastened to the weights 1, the plurality of the weights 1 are inhibited from moving by a predetermined magnitude or more. Therefore, it is easy to deal with the wheel balance weight of Example No. 4 before it is installed to a wheel.

In addition, in the wheel balance weight of Example No. 4, since the weights 1 and the regulatory plate 2 are bonded by spot welding, they can be bonded at a less expensive cost. Hence, the wheel balance weight effects an advantage in that it can reduce the cost required for manufacturing itself.

EXAMPLE NO. 5

Figure 10:
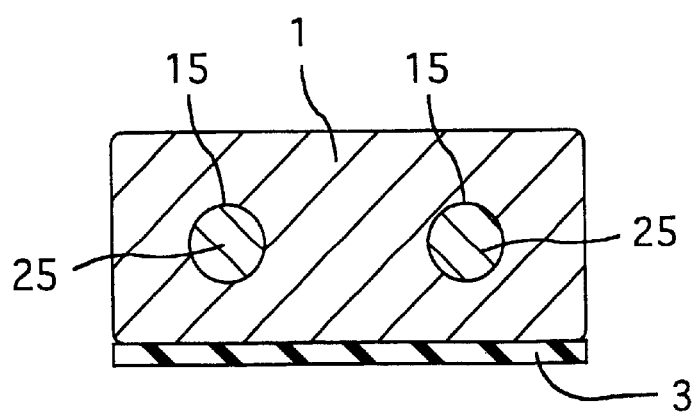
FIG. 10 is a cross-sectional view for illustrating a weight in Example No. 5 of a wheel balance weight according to the present invention.

A wheel balance weight of Example No. 5 according to the present invention comprises weights 1. FIG. 10 illustrates a cross section of the weights 1.

The wheel balance weight of Example No. 5 is constituted by a plurality of the weights 1, regulatory wires 25, 25 and a double-side-coated tape 3. The weights 1 are formed substantially as a rectangular parallelepiped, and has two through holes 15, 15, which penetrate through the lengthwise direction of the wheel balance weight of Example No. 5. The regulatory wires 25, 25 are made of a wire-shaped material, and are fitted into the through holes 15, 15, respectively. The double-side-coated tape 3 is adhered onto the rear surfaces of the weights 1.

Specifically, the wheel balance weight of Example No. 5 is a wheel weight balance in which the through holes 15, 15 are formed instead of the grooved portions 11 in the weights 1 of Example Nos. 1 through 4, and in which the regulatory wires 25, 25 were used instead of the regulatory plate 2 of Example Nos. 1 through 4.

The weights 1 are made of a substantially rectangular parallelepiped shaped iron material whose outer contour has a size of 18 mm in width, 11.5 mm in length and 3 mm in thickness. The through holes 15, 15 having a diameter of 2 mm are formed to penetrate through the weights 1 in the length-wise direction of the weights 1. The two through holes 15, 15 are formed so that their centers are positioned at a depth of 1 mm away from the rear surface of the weights 1, respectively, and so that their centers are separated at an interval of 10 mm.

The regulatory wires 25, 25 are made of an iron wire having a diameter of 2 mm.

The double-side-coated tape 3 has a strip shape, which agrees with the rear surfaces of the weights 1. As for the double-side-coated plate 3, a double-side-coated tape is used which is the same as the one used in Example No. 1.

In the wheel balance weight of Example No. 5, since the two regulatory wires 25, 25 are disposed so as to penetrate through the plurality of weights 1, the plurality of weights 1 are inhibited from moving by a predetermined magnitude or more. Therefore, it is easy to deal with the wheel balance weight of Example No. 5 before it is installed to a wheel.

EXAMPLE NO. 6

Figure 11:
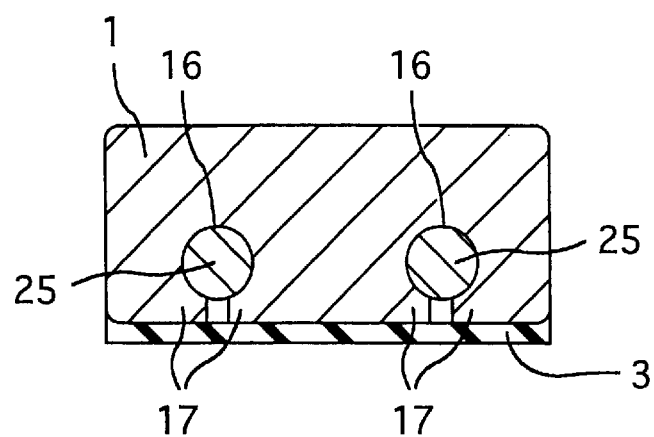
FIG. 11 is a cross-sectional view for illustrating a weight in Example No. 6 of a wheel balance weight according to the present invention.

A wheel balance weight of Example No. 6 according to the present invention comprises weights 1. FIG. 11 illustrates a cross section of the weights 1.

The wheel balance weight of Example No. 6 is constituted by a plurality of the weights 1, regulatory wires 25, 25 and a double-side-coated tape 3. The weights 1 are formed substantially as a rectangular parallelepiped, and has two grooved portions 16, 16 in the rear surface. The openings of the grooved portions 16, 16 are narrowed by crimping flanged portions 17, 17. The regulatory wires 25, 25 are fixed in the grooved portions 16, 16, respectively, by crimping the flanged portions 17, 17, and are made of a wire-shaped material. The double-side-coated tape 3 is adhered onto the rear surfaces of the weights 1.

Specifically, except that the plurality of weights 1 are used in which the grooved portions 16, 16 are formed instead of the through holes 15, 15, the wheel balance weight of Example No. 6 is identical with that of Example No. 5.

Figure 12:
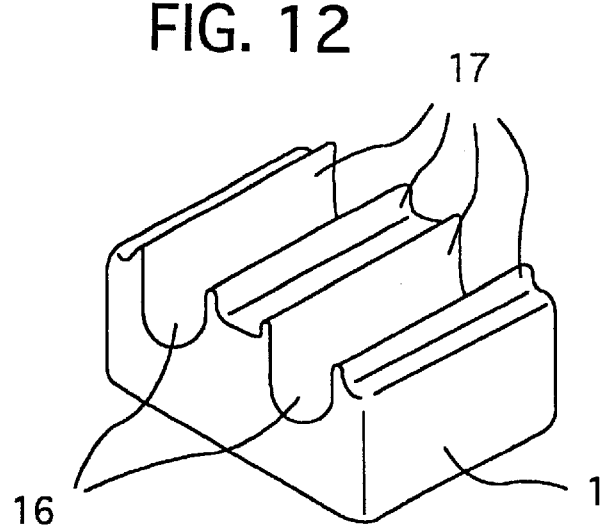
FIG. 12 is a perspective view for illustrating a weight in Example No. 7 of a wheel balance weight according to the present invention.

The weights 1 were made of a substantially rectangular parallelpiped shaped iron material whose outer contour has a size of 18 mm in width, 11.5 mm in length and 3 mm in thickness. On the rear sides, as illustrated in FIG. 12, there are formed the grooved portions 16, 16 and the flanged portions 17, 17. The flanged portions 17, 17 are disposed at the openings of the grooved portions 16, 16, and project from the rear surfaces of the weights 1. The grooved portions 16, 16 are formed so that they have a substantially letter "u"-shaped inner peripheral contour whose opening is disposed on the rear-surface sides of the weights 1. For instance, the grooved portions 16, 16 have a width of 2 mm and a deepest depth of 2 mm from the outermost rear surfaces of the weights 1. Moreover, the bottom surfaces of the grooved portions 16, 16 are formed so as to have a semi-circular shape having a diameter of 2 mm. The flanged portions 17, 17 are disposed at the openings of the grooved portions 16, 16, and are formed so as to project from the rear surfaces of the weights 1 by a height of 1 mm.

The grooved portions 16, 16 are formed so that their centers separate at an interval of 10 mm.

The regulatory wires 25, 25 are made of an iron wire having a diameter of 2 mm.

The double-side-coated tape 3 has a strip shape, which agrees with the rear surfaces of the weights 1. As for the double-side-coated plate 3, a double-side-coated tape is used which is the same as the one used in Example No. 1.

In the wheel balance weight of Example No. 6, since the two regulatory wires 25, 25 are fixed in the grooved portions 16, 16 of the plurality of weights 1, the weights 1 are inhibited from moving by a predetermined magnitude or more. Therefore, it is easy to deal with the wheel balance weight of Example No. 6 before it is installed to a wheel.

(Manufacturing Process)

The wheel balance weight of Example No. 6 could be manufactured in the following manner. First, the weights 1 were formed. Then, the flanged portions 17, 17 were crimped while the regulatory wires 25, 25 were fitted into the grooved portions 16, 16 of the weights 1. Finally, the double-side-coated tape 3 was bonded onto the rear surfaces of the weights 1.

For instance, the weights 1 were first formed by such means as pressing an iron plate, forging a wire rod, or the like. Note that, in the resulting weights 1, the flanged portions 17, 17 were formed so as to project from the rear surfaces of the respective weights 1. In FIG. 12, there is illustrated how the flanged portions 17, 17 projected from the rear surface of the weights 1.

The regulatory wires 25, 25 were disposed in the grooved portions 16, 16 of the weights 1. At this moment, the regulatory wires 25, 25 were placed so that they were brought into contact with the bottom surfaces of the grooved portions 16, 16.

Subsequently, the flanged portions 17, 17 were crimped toward the grooved portions 16, 16 so that not only they covered the openings of the grooved portions 16, 16 but also they are flush with the rear surfaces of the weights 1. When the flanged portions 17, 17 were crimped, the openings of the grooved portions 16, 16 were narrowed, and at the same time the crimped flanged portions 17, 17 pressed the regulatory wires 25, 25 toward the bottom surface of the grooved portions 16, 16. Thus, the regulatory wires 25, 25 were fixed in the grooved portions 16, 16 of the weights 1.

After the wheel balance weight of Example No. 6, in which the regulatory wires 25, 25 were fastened to the weights 1, was subjected to a plating treatment, one of the adhesive surfaces of the double-side-coated tape 3 was bonded onto the rear surfaces of the weights 1. The wheel balance weight of Example No. 6 was thus manufactured.

EXAMPLE NO. 7

Figure 13:
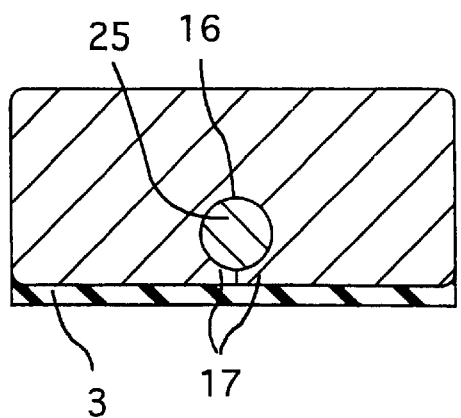
FIG. 13 is a cross-sectional view for illustrating a weight in Example No. 7 of a wheel balance weight according to the present invention.

A wheel balance weight of Example No. 7 according to the present invention comprises weights 1. FIG. 13 illustrates a cross section of the weights 1.

The wheel balance weight of Example No. 6 is constituted by a plurality of the weights 1, a regulatory wire 25 and a double-side-coated tape 3. In the weights 1, there are formed a grooved portion 16 in the rear surface. The opening of the grooved portion 16 is closed by crimping flanged portions 17, 17. The regulatory wire 25 is fixed in the grooved portion 16. The double-side-coated tape 3 is adhered onto the rear surfaces of the weights 1.

Specifically, except that one grooved portion 16 is formed in the weights 1 in the middle thereof and in the width-wise direction thereof, the wheel balance weight of Example No. 7 is identical with that of Example No. 6.

In the wheel balance weight of Example No. 7, since the regulatory wire 25 is fixed in the grooved portions 16 of the plurality of weights 1, the weights 1 are inhibited from moving by a predetermined magnitude or more. Therefore, it is easy to deal with the wheel balance weight of Example No. 7 before it is installed to a wheel. Moreover, since one regulatory wire 25 is placed in the weights 1, it is possible to reduce the man-hour requirement for installing the regulatory wire 25 to the weights 1. Accordingly, it is possible to keep the cost for manufacturing the wheel balance weight of Example No. 7 from going up.

Having now fully described the present invention, it will be apparent to one of ordinary skill in the art that many changes and modifications can be made thereto without departing from the spirit or scope of the present invention as set forth herein including the appended claims.

What is claimed is:

1. A wheel balance weight, comprising:

a plurality of weights;

an adhesive sealing member, having an adhesive surface to be bonded to an inner peripheral surface of a rim in a wheel, for fastening the plurality of weights onto the inner peripheral surface; and a regulatory member for inhibiting movement of at least two of the plurality of weights from moving by a predetermined magnitude, the at least two of the plurality of weights being disposed to neighbor with each other, at least two of said weights having means for supporting said regulatory member, the supporting means being a grooved portion formed in the at least two of said weights and in which said regulatory member is disposed.

2. The wheel balance weight according to claim 1, wherein said regulatory member is formed as a plate, which has a width being substantially equal to a width of the grooved portion.

3. The wheel balance weight according to claim 1, wherein at least a part of an outer peripheral surface of said regulatory member is linear, which substantially follows an inner peripheral surface of the grooved portion.

4. The wheel balance weight according to claim 1, wherein said regulatory member is fastened to the at least two of said weights.

5. The wheel balance weight according to claim 1, wherein said plurality of weights are disposed at predetermined intervals.

6. A wheel balance weight, comprising:

a plurality of weights;

an adhesive sealing member, having an adhesive surface to be bonded to an inner peripheral surface of a rim in a wheel, for fastening the plurality of weights onto the inner peripheral surface; and a regulatory member for inhibiting movement of at least two of the plurality of weights from moving by a predetermined magnitude, the at least two of the plurality of weights being disposed to neighbor with each other, at least two of said weights having means for supporting said regulatory member, the supporting means being a through hole formed through the at least two of said weights and into which said regulatory member is fitted.

7. The wheel balance weight according to claim 6, wherein said regulatory member has a cross-sectional shape, which substantially agrees with a cross-sectional shape of the through hole.

8. The wheel balance weight according to claim 6, wherein said regulatory member is fastened to the at least two of said weights.

9. The wheel balance weight according to claim 6, wherein said plurality of weights are disposed at predetermined intervals.

* * * * *